United States Patent [19]
Mutsushika et al.

[11] Patent Number: 5,683,735
[45] Date of Patent: Nov. 4, 1997

[54] METHOD FOR PRODUCING HIGH-QUALITY FLAVOR AND PRODUCT THEREOF

[75] Inventors: Osamu Mutsushika; Masatoshi Noda, both of Aichi-ken; Wakako Matsushima, Gifu-ken, all of Japan

[73] Assignee: Pokka Corporation, Aichi-ken, Japan

[21] Appl. No.: 572,064

[22] Filed: Dec. 14, 1995

[30] Foreign Application Priority Data

Dec. 27, 1994 [JP] Japan ................................ 6-336916

[51] Int. Cl.⁶ .............................. A23L 1/221; A23L 2/56
[52] U.S. Cl. ................ 426/533; 426/330.5; 426/534; 426/599; 426/615; 426/616
[58] Field of Search ................................ 426/533, 599, 426/330.5, 534, 615, 616

[56] References Cited

U.S. PATENT DOCUMENTS

| | | | |
|---|---|---|---|
| 4,154,864 | 5/1979 | Risler et al. | 426/599 |
| 4,463,024 | 7/1984 | Nishizawa et al. | 423/533 |
| 5,049,402 | 9/1991 | Tamaki et al. | |
| 5,328,703 | 7/1994 | Nakagawa et al. | 426/599 |

FOREIGN PATENT DOCUMENTS

| | | |
|---|---|---|
| 5-146280 | 6/1993 | Japan . |
| 5-176708 | 7/1993 | Japan . |

*Primary Examiner*—Helen Pratt
*Attorney, Agent, or Firm*—Brody and Neimark

[57] ABSTRACT

The present invention relates to a method for producing a flavor having fresh taste and freshness, comprising adding some part of fruit juice to a certain flavor and treating at a pressure of 100 MPa to 400 MPa for 10 seconds and more, and relates to a method for producing an excellent fruit drink having fresh taste and freshness industrially in a simple manner, i.e., by simply adding an extremely small amount of the high-quality flavor of the present invention to fruit juice.

7 Claims, No Drawings

METHOD FOR PRODUCING HIGH-QUALITY FLAVOR AND PRODUCT THEREOF

DETAILED DESCRIPTION OF THE INVENTION

1. Field of the Invention

The present invention relates to a method for producing a high-quality flavor. More specifically, the present invention relates to a novel flavor having excellent taste and freshness in combination.

2. Prior Art

For producing fruit drinks, a certain flavor is added to supplement the deterioration and modification of the taste of fresh fruit juice, the loss of the flavor of the juice and the occurrence of heat odor. However, it is not satisfactory.
Problems to be Solved by the Invention The objective of the present invention is to efficiently develop a novel system at low cost for producing a flavor having fresh taste and freshness in combination effectively, economically and industrially.
Means for Solving the Problems So as to attain the above objective, intensive investigations have been carried out.

SUMMARY OF THE INVENTION

In experiments by the present inventors, a fruit drink has been prepared by blending an extremely small amount of fruit juice with a fruit flavor and subjecting the resulting mixture to a high-pressure treatment to produce a flavor, and adding an extremely small amount of the resulting flavor to fruit juice. Far beyond our expectation, a fruit juice with extremely excellent fresh taste and flavor has been successfully produced, compared with fruit juices with addition of fruit flavors never treated with any high-pressure. Additionally, it has been confirmed that the fruit drink with addition of the high-quality flavor of the present invention can acquire excellent stability over time in addition to the enhancement of flavor in spite of addition of a small amount of the high-quality flavor.

The present invention has been achieved on the basis of these findings. The high-quality flavor in accordance with the present invention characteristically has novel effects conventionally unknown in that the flavor can readily supplement the loss of the flavor of fruit juice during thermal sterilization thereof and also provides the taste and flavor of fresh fruit juice. Furthermore, the high-quality flavor of the present invention can be produced by blending a flavor and a small amount of fruit juice together, and thus, the present flavor characteristically saves the cost dramatically in spite of an expensive high-pressure machine therefor because the high-pressure treated flavor should be added only at a ratio of about 1/1000.

DETAILED DESCRIPTION OF THE INVENTION

The present invention will be described in details.

For practicing the present invention, a flavor is blended with an extremely small amount of fruit juice prior to a pressurizing treatment by any method for providing a high pressure, wherein any high-pressure machine commercially available may appropriately be used. The conditions for the pressurizing treatment should be a high pressure for a long duration, and as the conditions for establishing the economy and effect in combination, the pressure should be 100 to 400 MPa, preferably 200 to 300 MPa, while the duration of the treatment should be 10 seconds to 60 minutes, preferably one minute to 30 minutes. The high-pressure treatment should be carried out in the temperature range in which the mixture of a flavor and an extremely small amount of fruit juice does not freeze and the upper limit of the temperature is room temperature. Preferably, these conditions may be selected appropriately, depending on the type of fruit juice to be treated, treating pressure, duration and temperature to be preset.

The flavor as a raw material for producing the high-quality flavor of the present invention may be any natural flavor or artificial flavor; various flavors in a mixture may be used appropriately.

The natural flavor means any matter comprising a flavorous substance(s), which matter is prepared by a routine method from a plant or animal, such as plant root, wood bark, flower, fruit, and fruit peel. Therefore, the natural flavor includes essential oils produced by processing natural raw materials, for example, by steam distillation, compression, extraction, etc., thereby separating the oils.

As the artificial flavor, use may be made of hydrocarbons, alcohols, aldehydes, ketones, esters, phenol ethers, lactones, quinones, and various organic acids, singly or in combination, commercially available flavors may be used appropriately. Artificial flavors may be blended with natural flavor. Commercially available various fruit flavors, fruit fragrances, flower flavors, flower fragrances, etc. may be used freely which are prepared by using alcohol, glycerine, propylene glycol or other substance.

As the fruit juice, use may be made of various fruit juices such as those of citrus fruits, apple, pear, grape, pineapple, etc.; as the citrus fruits, use may be made of, for example, grapefruit, navel orange, iyokan (Citrus iyo), hassaku (Citrus hassaku), natsukan (Citrus natsudaidai), amanatsukan (sweet-type of Citrus natsudaidai), unshiu mikan (Citrus unshiu), lemon, sudachi (Citrus sudachi), kinkan (Fortunella), zabon (Citrus grandis), orange and the like.

In accordance with the present invention, as the fruit juice to produce the high-quality flavor of the present invention and to produce fruit drinks with the addition of said flavor, use may be made of intact fruit juice which means juice directly expressed from fruit, diluted fruit juice, concentrated fruit juice, frozen fruit juice or reconstituted fruit juice. Frozen fruit juice, frozen citrus fruit juice in particular, enhances its bitterness over time, and when frozen juice is thawed, freezing odor and thawing taste may also develop to deteriorate the quality. In accordance with the present invention, these may be prevented as well.

In order to practice the present invention, it is necessary that a small amount of fruit juice should be added to a certain flavor prior to high-pressure treatment, but the initial objective cannot be attained when the amount of said fruit juice to be added is greater than the amount of said flavor. Thus, fruit juice should be blended with a flavor at a ratio of less than one part by weight of fruit juice to one part by weight of a flavor, preferably at a ratio of 0.01 to 0.5 part by weight of fruit juice to one part by weight of a flavor, more preferably at a ratio of 0.08 to 0.15 part by weight of fruit juice to one part by weight of a flavor.

The type of fruit juice to be blended with a flavor is normally the same type as the type of said flavor, such as the combination of grapefruit juice and grapefruit flavor. However, the combination may be modified; other than fruit flavors, flower flavors and other various flavors may be used as such flavor to produce a variety of products.

By adding to and blending with fruit juice a small amount of the high-quality flavor thus produced by blending a small amount of fruit juice to a certain flavor prior to high-pressure treating, an excellent fruit drink having fresh taste and freshness over an extended period can be produced effectively and industrially.

An extremely small amount of the high-quality flavor may be added to fruit juice to be used as the raw material of fruit drinks, with a satisfactory effect, and the amount of flavors, conventionally employed for the production of fruit drinks, may be applied as it is. Generally, about 0.01 to 0.2 part by weight of the high-quality flavor may be blended with 100 parts by weight of fruit juice, but remarkable effects such as the production of hybrid fruit drinks having novel, conventionally unknown taste, may be brought about, outside the range described above or by the modification of the combination of fruit juice and a flavor as described above.

The examples of the present invention will be described below.

EXAMPLE 1

Grapefruit juice produced in Florida, North America, was diluted to 10° Brix, and the resulting fruit juice was blended with a grapefruit flavor produced in USA at a ratio of 9 to 1 (2.7 kg: 0.3 kg). Then, the mixture was subjected to a pressure of 300 MPa at room temperature for 20 minutes by means of a Mitsubishi high-pressure machine MCT-150 as a high-pressure machine, to produce a high-quality flavor.

To the grapefruit juice preliminarily diluted to 10° Brix was added a part (0.1%) of the high-quality flavor produced above, followed by agitation, to produce a fruit drink.

In a sensory test, the taste and flavor of the fruit drink thus produced was examined by ten skilled panelists. As a control, furthermore, a fruit drink with addition of a flavor never treated with any high-pressure was produced for the test. Consequently, 7 panelists assessed that the samples using therein the novel flavor produced by blending the flavor with the fruit juice at 9:1 and subjecting the mixture to high-pressure treatment were superior with respect with fresh taste and freshness.

Effect of the Invention

By using the high-quality flavor of the present invention, the deterioration of quality of flavor in particular, such as the deterioration of flavor, the loss of good flavor and the occurrence of heat odor inevitably caused in conventional production of fruit drinks requiring thermal sterilization and the like, may be prevented efficiently. Additionally, novel useful effectiveness conventionally unknown such as fresh taste and freshness, can be realized.

What is claimed is:

1. A method for producing a high quality flavor comprising adding from 0.01 to 0.5 part by weight of citrus fruit juice to one part by weight of citrus fruit flavor and subjecting the resulting mixture to a pressure of from 100 to 400 MPa for from 10 seconds to 60 minutes.

2. A method according to claim 1 wherein the citrus fruit juice is at least one member selected from the group consisting of intact fruit juice, diluted fruit juice, concentrated fruit juice and frozen fruit juice, and the citrus fruit flavor is at least one member selected from the group consisting of natural flavors and artificial flavors.

3. A high quality flavor produced according to the method of claim 2.

4. A fruit drink produced by a method which comprises adding the high quality flavor produced according to the method of claim 2 to fruit juice.

5. A high quality flavor produced according to the method of claim 1.

6. A fruit drink produced by a method which comprises adding the high quality flavor produced according to the method of claim 1 to fruit juice.

7. A method according to claim 1 wherein the pressure treatment is conducted at a temperature for which the upper limit is room temperature.

* * * * *